Figure 1:
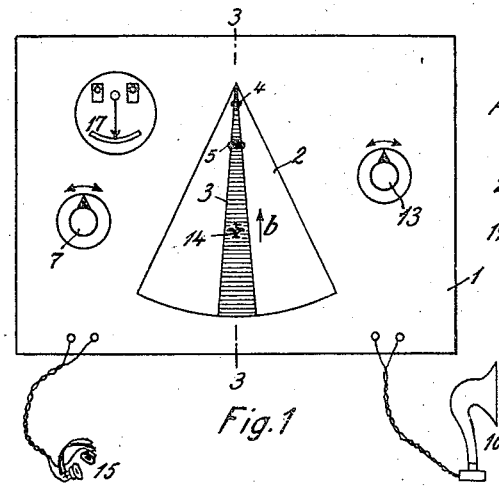

Dec. 31, 1940.  E. KRAMAR  2,226,726

EDUCATIONAL APPLIANCE FOR AIRCRAFT NAVIGATION

Filed Oct. 15, 1937

Inventor:
Ernst Kramar
by R. C. Hopgood
Attorney

Patented Dec. 31, 1940

2,226,726

UNITED STATES PATENT OFFICE 2,226,726

EDUCATIONAL APPLIANCE FOR AIRCRAFT NAVIGATION

Ernst Kramar, Berlin-Tempelhof, Germany, assignor to C. Lorenz Aktiengesellschaft, Berlin-Tempelhof, Germany, a company Application October 15, 1937, Serial No. 169,244
In Germany October 15, 1936

7 Claims. (Cl. 35—12)

The present invention relates to an apparatus for familiarizing a novice with visual and audible signals encountered in radio systems for guiding aircraft.

The well-known radio landing beacon operates by radiating two different but complementary signals which, when heard at equal amplitude, will merge into a continuous dash. This continuous dash can be heard by the pilot only within a narrow area, the landing or desired area. To the right of this area one of the signals, and to the left of the area the other signal radiated by the beacon is heard.

In accordance with the present invention the landing area is visualized. An image representing the airplane is movable with respect to a simulated landing field, at the center of which a narrow sector represents the area within which one must land, indicated in practice by the continuous dash signal.

The device forming the subject of this invention has also an acoustic signaling arrangement. This acoustic signaling arrangement is automatically varied as the pupil varies the position of the airplane image.

Audible or visual or both kinds of signals are produced as in practice. As the pupil simulates flight by moving the image representing the airplane into any position with respect to the "landing field," the acoustic device is automatically actuated to produce the kind of signal that would be produced in practice in the earphones of a pilot by the landing beacon. The pupil will thus learn the landing signals.

In addition to the acoustic signaling arrangement, a visual indicator is also provided to teach observation of deviations from the landing course.

The drawing represents an embodiment of the present invention.

Figure 3:
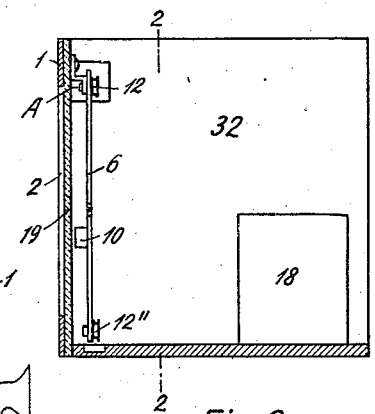
Figure 2:
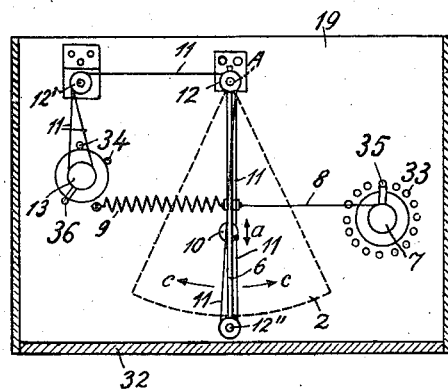
Figure 5:
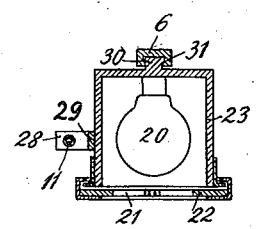
Figure 7:
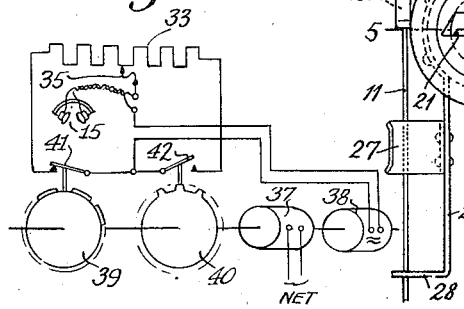
Figure 4:
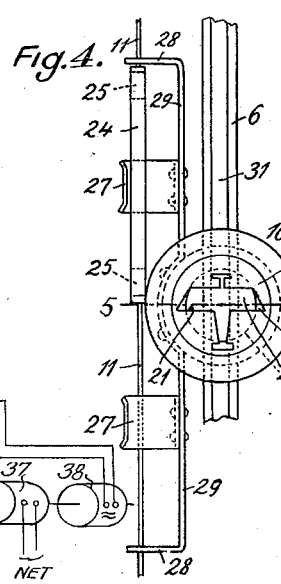
Figure 6:
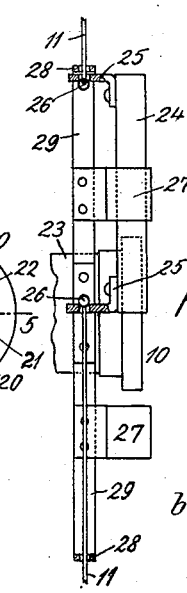

Fig. 1 is a partially diagrammatic front elevation of the arrangement chosen as an example. Fig. 2 shows a section through the appliance on line 2—2 of Fig. 3. Fig. 3 represents a section on line 3—3 of Fig. 1. Fig. 4 is a fragmentary elevation that illustrates a detail arrangement more fully referred to hereafter. Fig. 5 shows a section on line 5—5 of Fig. 4. Fig. 6 is a partially sectioned side view to Fig. 4. Fig. 7 diagrammatically illustrates a portion of the circuits and controlling mechanism.

Figs. 4, 5, 6 are drawn to a larger scale than Figs. 1, 2, 3.

The wall 1 of an open box 32 has a sector-shaped aperture 2 which is covered with a translucent pane 19, e. g., of ground glass. On pane 19 a sector 3 is represented which has the same top or centre point as has aperture 2 and is provided with two characteristic markers 5, 4 located in the neighbourhood of this centre point. Mounted in wall 1 are adjusting knobs 7, 13 and a pointer instrument 17. On the back of wall 1 and pane 19 a lever 6 is journaled on a pivot A. This lever is movable in the directions indicated by arrows c, Fig. 2, under the control of a traction member 8 and of a spring 9. The traction member 8, for instance a belt, is wound upon knob 7 or unwound therefrom depending on the direction in which lever 6 is moved. Thus, by turning knob 7 lever 6 may be displaced over the aperture 2. When this is done a contact arm 35 of the knob 7 slides over contacts 33. Knob 13 has a contact arm 36 intended to cooperate with two contacts 34.

In addition to lever 6 a roller 12 is mounted on pivot A. A roller 12' is likewise carried by the wall structure 1, 19. Lever 6 has a roller 12" fitted to its lower end. The rollers 12, 12', 12" and the knob 13 carry an endless belt 11, for instance a wire. Belt 11 is attached to a projector 10 which as indicated by the double arrow a, Fig. 2, is displaceable along lever 6. The device 10 serves to produce on pane 19 a visual indication 14, for instance the image of an airplane.

The projector 10 comprises a shell 23, a glow lamp 20 disposed therein, and a cover disc 22 which as shown in Fig. 5 is rotatably fixed to the shell 23 and has an airplane shaped aperture 21. Shell 23 has a dovetailed projection 30 which as shown in Fig. 6 fits in a longitudinal groove 31 of the lever 6. Disc 22 is under the action of a friction member 24 whose length equals half the circumference of this disc. The friction member 24, which may be of rubber, for instance, has a projection 25 at each end. Belt 11 is provided with two enlargements 26 by which it is attached to the respective projection 25 in the manner appearing from Fig. 6. Projecting into the path of the projections 25 are fingers 28 formed integral with a flat bar 29 fixed to shell 23. Belt 11 extends through openings of the fingers 28. Fastened to the bar 29 are guide members 27 adapted to aid the friction member 24 in its action on the disc 22. When in Fig. 4 the upper part of the member 11 is pulled upwards, part 24, 25 by acting against the upper finger 28 takes with it the device 10 which hence is displaced upward along lever 6 owing to the dovetail guide 30, 31. When, however, the lower part of the member 11 is pulled downward, the motion of the member 11 thus being reversed, the friction effective between the parts 24, 22 first causes the disc 22 to make a half-revolution whereby aperture 21 is brought to assume the opposite position to that represented in Fig. 4. Part 24, 25 now comes against the lower finger 28 so as to displace device 10 downward along lever 6.

The contact arms 35, 36 and contacts 33, 34 serve for adjusting an arrangement of resistances not shown, over which a pair of headphones and a loudspeaker 16 can be connected with a device 18 that comprises a current generator and means for energizing the acoustic devices 15, 16 periodically.

The arrangement is shown in Fig. 7. This arrangement is driven by a motor 37 which is fed from the mains supply. The shaft of the motor is coupled with a generator 38 which produces the necessary alternating frequency and, moreover, this shaft carries two cam discs 39 and 40 which open and close two contacts 41 and 42 in a periodic rhythm. The contacts 41 and 42 control circuits in which the head set 15, or a loud speaker (not shown), is inserted. The cams of the discs 39 and 40 have different shapes so that one cam closes a contact while the other cam opens a contact. The contacts 41 and 42 make and break in the same rhythm so that normally dots and dashes are transmitted. The resistances are arranged as a potentiometer 33 on which the tap 35 is slid. Immediately after each cam of one of the said discs a cam of the other disc acts on the associated contact so that the tones produced by these contacts closing the circuits of the devices 15, 16 are combined into a uniform permanent signal, the so called continuous dash line, if upon the closing of one contact the same resistance is serially connected to the devices 15, 16 which was connected upon the closing of the other contact. Such is the case, for instance, when knob 7 is in the position shown in Figs. 1 and 2, that is, when contact arm 35 is in its upper mid-position. If however knob 7 is turned out of this position then by closing one of the contacts a greater resistance is connected in series with the devices 15, 16 than by closing the other contact. Owing to this, either the dashes will be louder than the dots or vice versa, depending whether knob 7 is turned in one direction or the other.

Aperture 2 represents the space within which the aircraft must move in landing. As long as the aircraft is within the space represented by sector 3 the pilot's head-phones, represented by the device 15, for instance, reproduce the continuous dash line, that is, a permanent tone. This tone will assure the pilot that he is flying in the direction of the landing place, represented in my device by the centre point of the sectors 2, 3. Whenever the aircraft happens to overfly the right-hand or left boundary of the space here represented by sector 3, the tone heard by the pilot will change. When overflying one of the radial boundaries corresponding to the sector 3, the dashes preponderate, while when overflying the other boundary the dots will preponderate. These indications will cause the pilot to alter the course until he shall again hear the continuous dash line.

Instead of the dash-dot method any other suitable method may be employed, such as the so-called a—n method, for instance, with which the Morse signals · — and — ·. Similarly, the said dashes and dots serve to complement each other to make the continuous dash line. All these signals are in a well known manner emitted by the so-called keying of the reflectors or the like, alternately to render them effective and ineffective, for instance by opening and closing contacts provided in the reflectors. Such arrangement is disclosed in my Patent No. 2,028,510.

Deviations from the proper course are in practice visualized by a direction indicator in the instrument board of the aircraft. The pilot when flying in the proper direction also receives two acoustic signals which advise him of the position of the aircraft. These two signals, known as warning signal and main signal may differ in pitch, e. g., the warning signal may be a deep tone and the main signal a high tone. These two signals correspond to the characteristic signs or markers 5, 4 shown in Fig. 1.

The sign or image 14 is movable in all directions within aperture 2 by displacing the projector 10 along lever 6 and by displacing the lever itself.

The projector 10 is displaced along lever 6 by turning the knob 13 which with the aid of the belt 11 determines the position of device 10 on lever 6. As soon as the image 14, moved in the direction of the arrow b, arrives at the characteristic marker 5, contact arm 36 reaches one of the contacts 34, thus causing headphones 15 and loudspeaker 16 to be energized. When image 14 arrives at the characteristic marker 4, arm 36 reaches the other contact 34 and the devices 15, 16 are again rendered effective. In this way, before landing, that is, before image 14 arrives at the centre point of the sectors 2, 3, a warning signal and a main signal are heard in the same manner as on board aircraft.

As has been explained with respect to Figs. 4, 5, 6, whenever the direction of movement of image 14 is reversed, its front portion, representing the propeller, will be in the direction of flying.

The displacement of lever 6 and thus of the projector 10 about pivot A as fulcrum is effected by turning the knob 7, thus actuating belt 8 and spring 9. The contact arm 35 of the knob 7 then acts to energize the acoustic devices 15, 16 over the contacts 33. Whenever lever 6 is turned in the direction of the arrow c shown on the right in Fig. 2, then corresponding to each contact 33 reached by arm 35, the dash signals, for instance, will be increasing in loudness as compared to the dot signals the loudness of which will be decreasing. This, as before described, is due to the fact that arm 35 by stepping from one of the contacts 33 to the next acts to vary the mutual ratio of series resistances associated with the devices 15, 16. Whenever lever 6 is turned in the direction of the arrow c shown on the left in Fig. 2, then for the same reason as before each step made by the arm 35 causes the dot signals to increase in loudness over the dash signals, the loudness of which is decreasing accordingly, as is the case also in practice.

The position of the image 14 is indicated also optically, that is, by the pointer instrument 17 that corresponds to the direction indicator of an aircraft.

It will be obvious from the foregoing description that the instrument as described may be used in any suitable location, either on a practice aircraft or an aircraft in operation under control of a pilot or even apart from an aircraft as may be desired.

What is claimed is:

1. An appliance for instruction of aircraft pilots concerning aircraft guiding beam signals, comprising a wall having a sector simulating the area over a landing field in which landing may be safely made represented thereon, a movable indicator simulating an aircraft positioned in said sector, means for producing audible signals simulating signals produced by radio beacons in aircraft receivers controlled by the position of said indicator within said sector and means for moving said indicator.

2. An appliance for the instruction of aircraft pilots concerning aircraft guiding beam signals, comprising a wall having a sector simulating a portion of the area over which a craft flies to a landing represented thereon, a movable indicator simulating an aircraft positioned in said sector, a pointer instrument simulating an instrument board indicator for indicating the position of said movable indicator in said sector, and means for simultaneously moving said indicator and controlling said instrument.

3. An appliance according to claim 1 wherein said wall comprises a translucent screen and said indicator comprises an airplane image projected on said screen.

4. An appliance for the instruction of aircraft pilots concerning aircraft guiding beam signals, comprising a wall having a sector simulating a portion of the area over which a craft flies during landing represented thereon, a lever, means for projecting an airplane image simulating the landing aircraft on said wall mounted on said lever and comprising a shell, a source of light disposed therein, and a rotatable cover disc fitted to said shell and provided with an aperture in the shape of an airplane, means for displacing said projecting means along said lever to move the portion of said image within said sector, means for rotating said cover controlled by the direction of displacement of said projecting means, means for producing audible signals simulating signals produced by radio beacons in aircraft receivers, and means for moving said lever for controlling said signals.

5. An appliance according to claim 4 wherein said means for displacing said projecting means along said lever also controls means for further energizing said means for producing audible signals at predetermined displacements of said projecting means simulating signals receivable on a craft for the particular position thereof.

6. An appliance according to claim 4 wherein said means for moving said lever and controlling said signals comprises a resistance for varying the intensity of said signals.

7. An appliance according to claim 4 having a second sector simulating the safe landing area for said craft, whose center coincides with the center of said first sector and whose angle is smaller than the angle of said first sector.

ERNST KRAMAR.